United States Patent

[11] 3,612,230

[72] Inventors Robert L. Ludington
Stop 34 Duneland Beach, Michigan City, Ind. 46360;
Robert M. Holloway, 921 North Roeske Trail, Pottawattomie, Michigan City, Ind. 46369
[21] Appl. No. 1,266
[22] Filed Jan. 7, 1970
[45] Patented Oct. 12, 1971

[54] BRAKE MECHANISM FOR DIFFERENTIAL VEHICLE LOADINGS
24 Claims, 19 Drawing Figs.

[52] U.S. Cl. .................................................. 188/195, 303/23
[51] Int. Cl. .................................................. B60t 8/18
[50] Field of Search .................................................. 188/153, 195, 198-203; 303/22, 23

[56] References Cited
UNITED STATES PATENTS

| | | | |
|---|---|---|---|
| 1,935,809 | 11/1933 | McCune ...................... | 303/23 |
| 1,993,653 | 3/1935 | Douziech ...................... | 303/23 |
| 3,335,825 | 8/1967 | Mersereau et al. ........... | 188/195 |

Primary Examiner—Duane A. Reger
Attorney—Ward, McElhannon, Brooks & Fitzpatrick

ABSTRACT: A fluid cylinder and piston and piston sleeve arrangement for providing different brake pressures with different vehicle loads in which the piston sleeve is limited in its movement by means controlled in accordance with the spacing between a pair of members of the vehicle, the spacing being determined by the vehicle load.

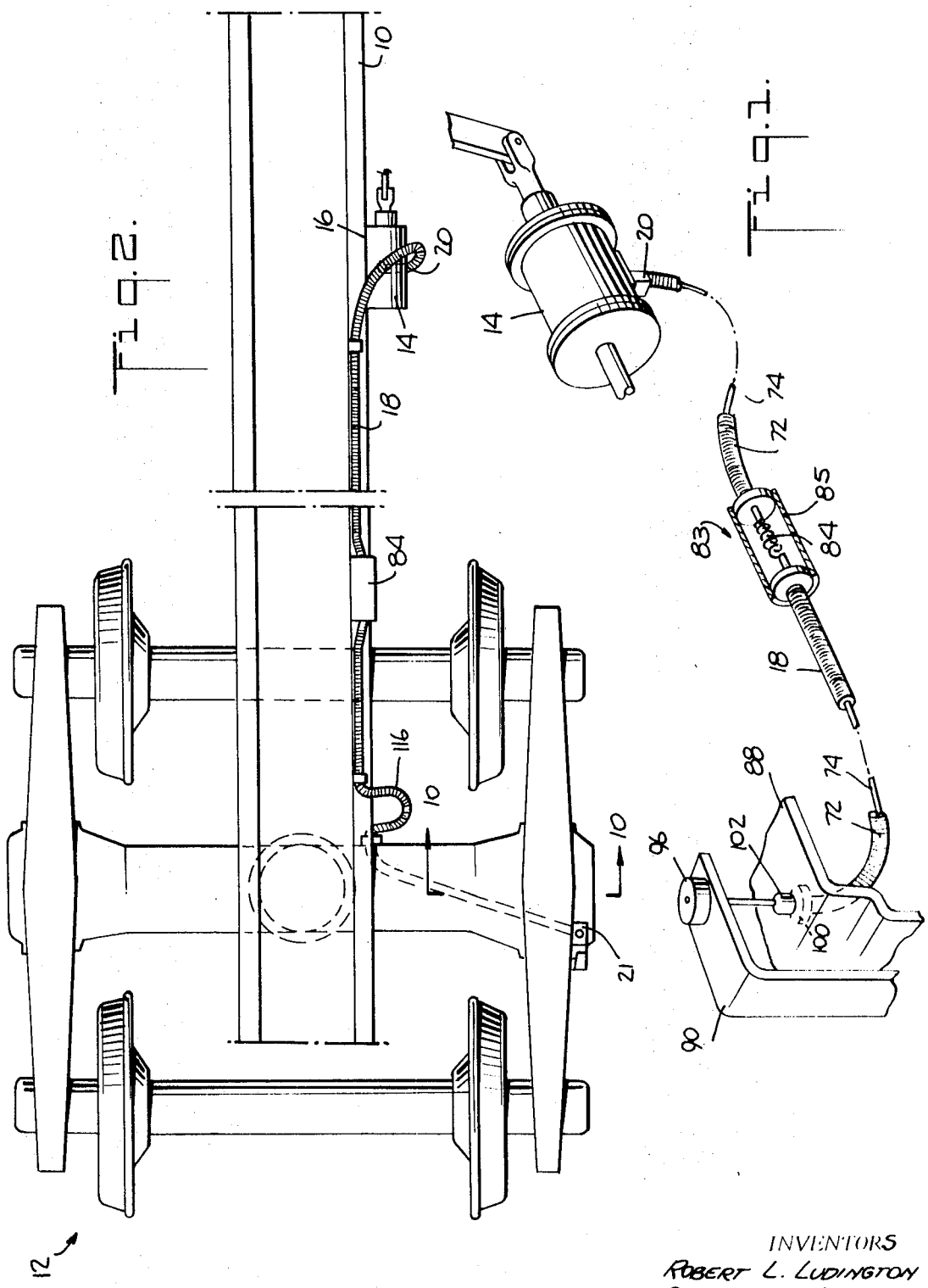

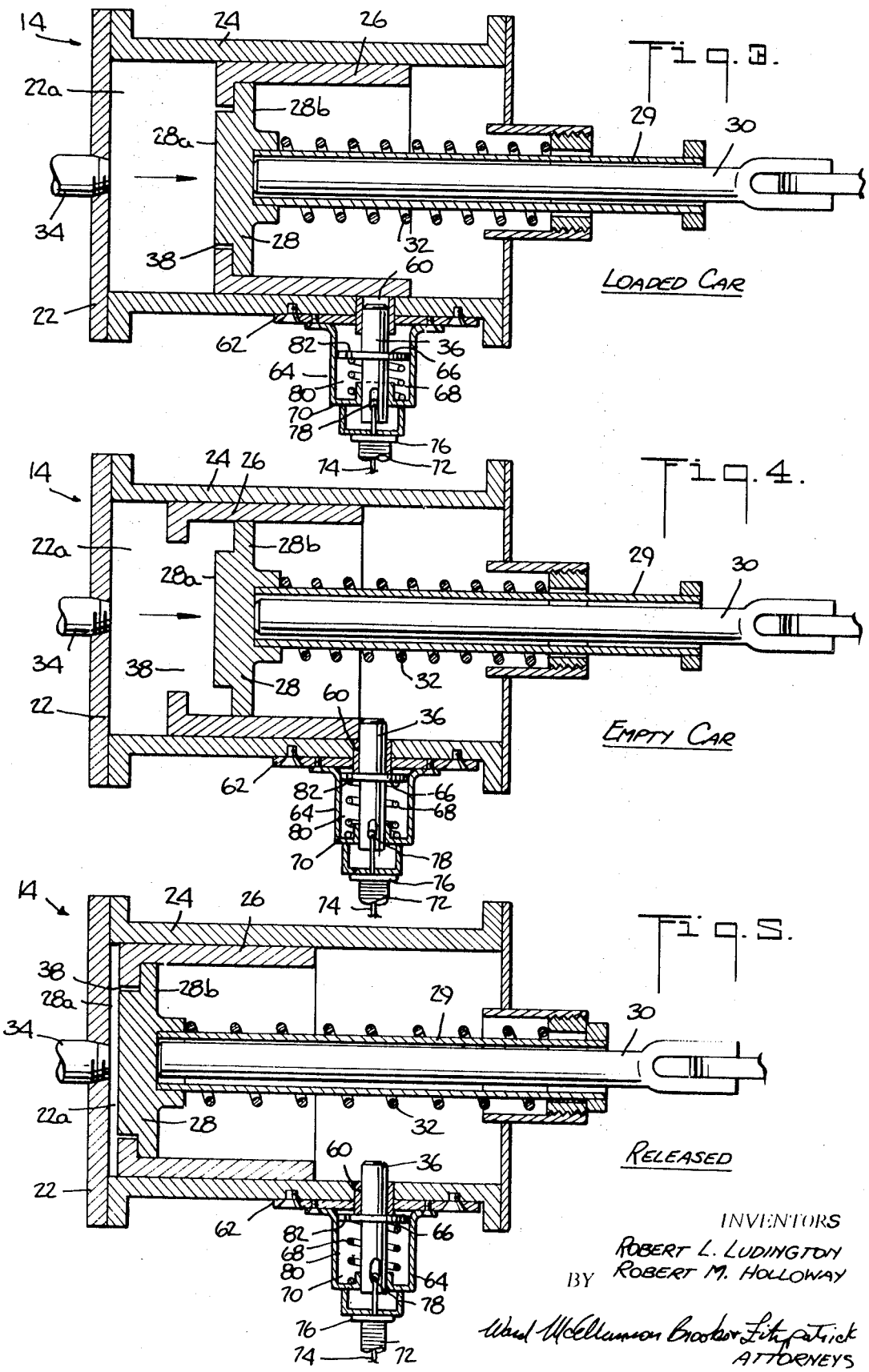

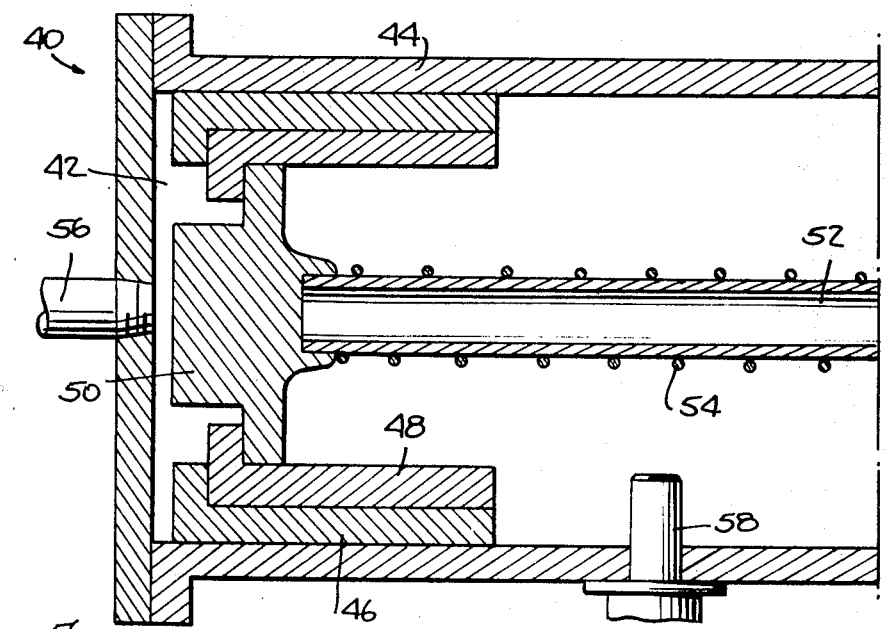
Fig. 6. RELEASED
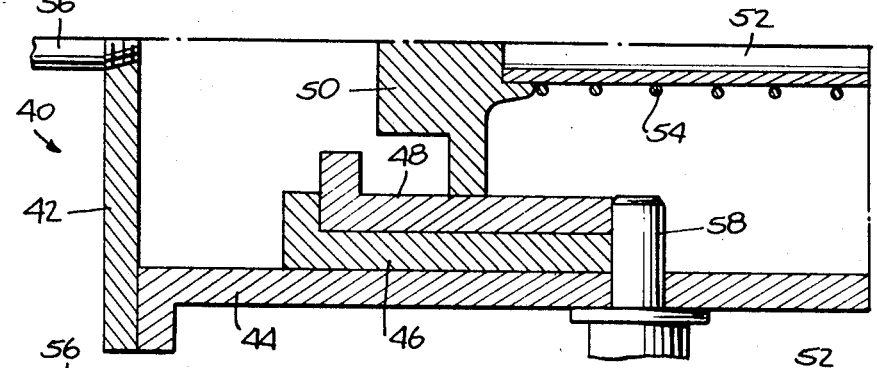
Fig. 7. EMPTY CAR
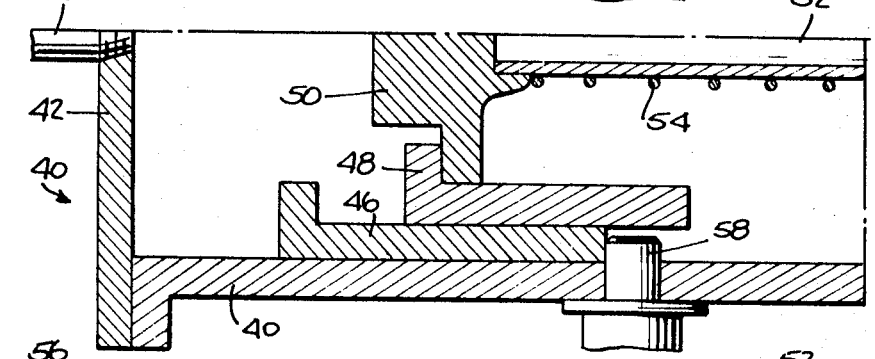
Fig. 8. PARTIALLY LOADED CAR
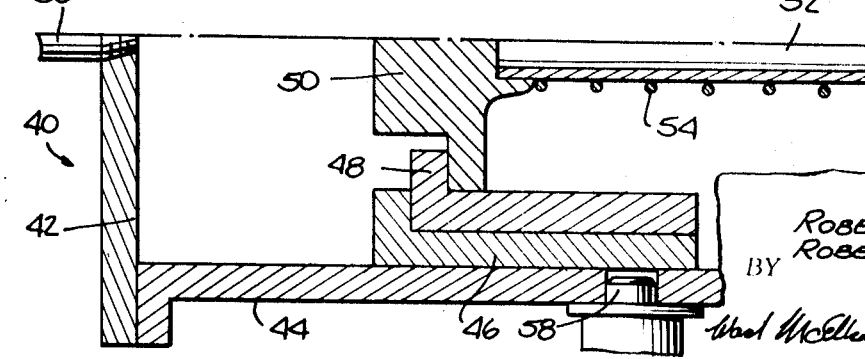
Fig. 9. LOADED CAR
INVENTORS
ROBERT L. LUDINGTON
ROBERT M. HOLLOWAY
BY
ATTORNEYS

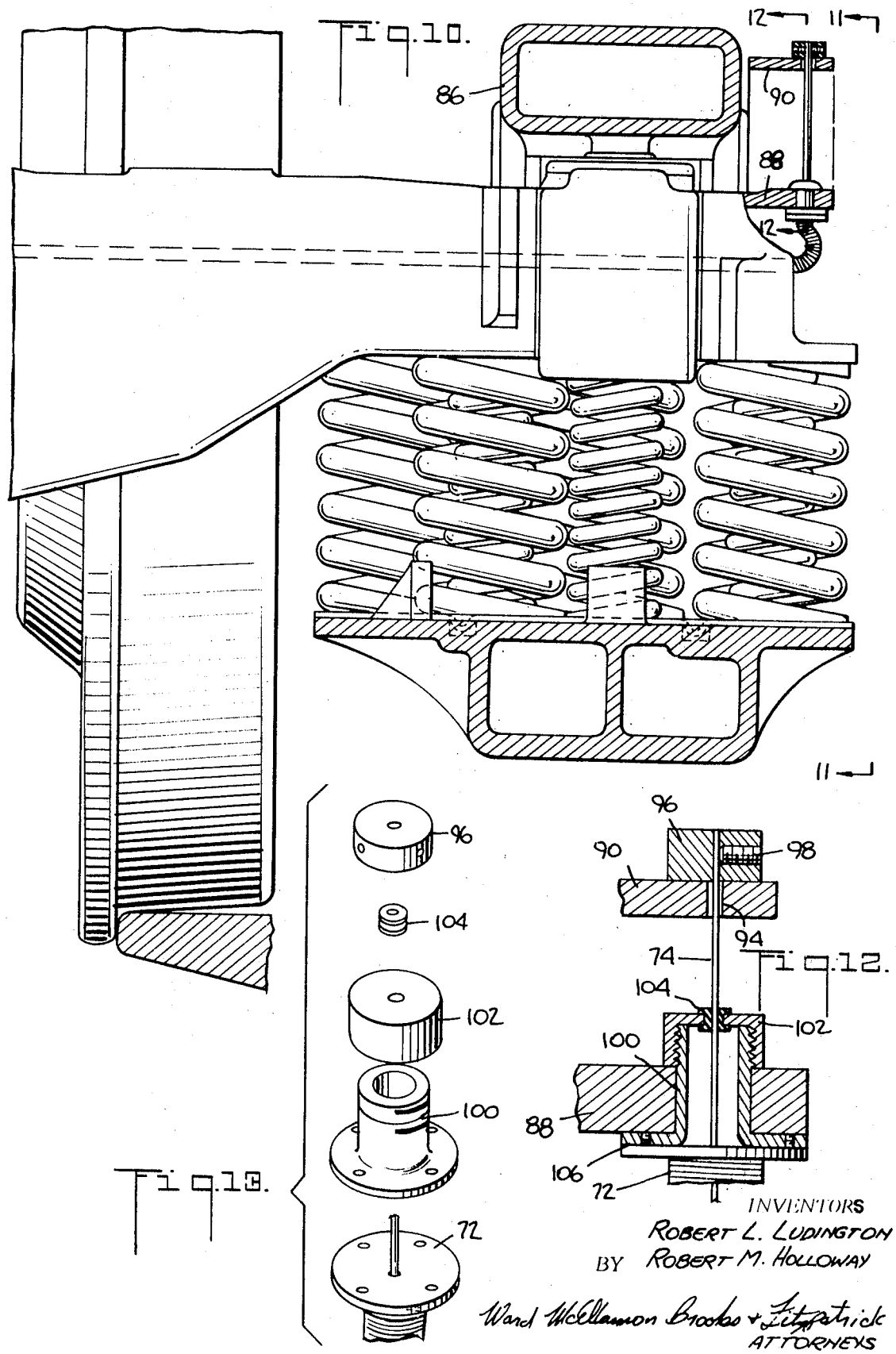

INVENTORS
ROBERT L. LUDINGTON
BY ROBERT M. HOLLOWAY

Ward McElhannon Brooks & Fitzpatrick
ATTORNEYS

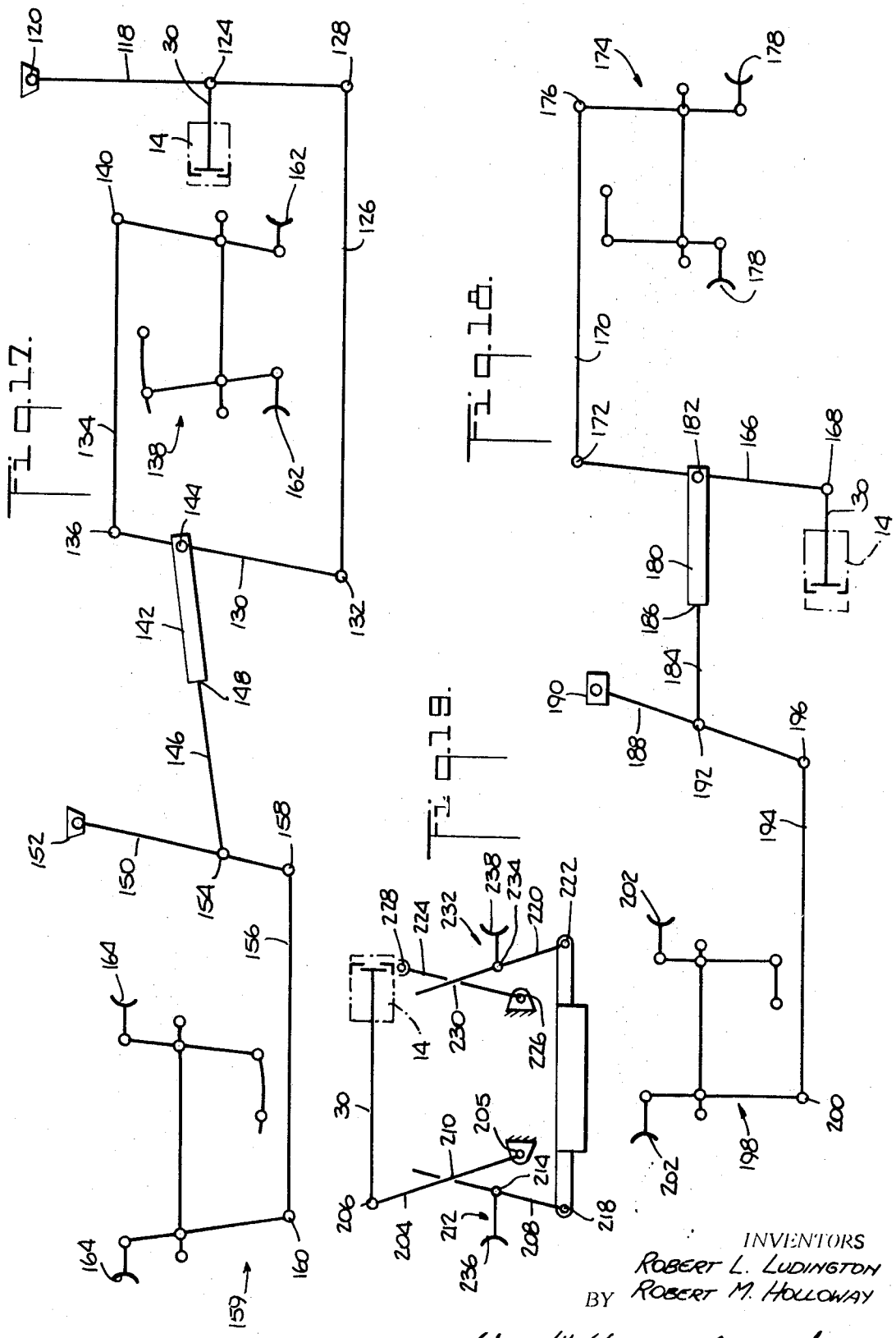

BRAKE MECHANISM FOR DIFFERENTIAL VEHICLE LOADINGS

This invention relates to brake mechanisms and, more particularly, empty and load brake mechanisms for vehicles.

The brake mechanism according to this invention is particularly adapted, among other possible applications, for use on standard railway cars such as are now widely in use on American, Mexican and Canadian railways. The brake mechanisms according to this invention may be used as new or original equipment on the railway cars, or they may be used as replacements or attachments to brake mechanisms presently in operation.

Heretofore, considerable difficulty has been experienced due to the fact that the usual brake mechanisms constructed in accordance with the prior art concepts resulted in overbraking empty railway cars and underbraking loaded railway cars. Some cars were built so that the empty car weight was increased in order to keep from using certain prior art empty and load brake equipment. It is an object of the present invention to overcome the difficulties which were inherent with the usual prior art mechanisms.

Another object of this invention is to provide a new and improved braking mechanism which provides a variable braking force depending upon the load being carried by the car and which can be used with standard railway brake mechanisms.

The performance of railway equipment used in the United States is specified by the rules of the Association of American Railroads. The rules of such Association, effective Jan. 1, 1969, include the following Rule 3(b) (6):

Braking Power: All freight cars built new or rebuilt prior to Jan. 1, 1965, offered in interchange, having metal brakeshoes, shall have a nominal braking ratio of not less than 50 nor more than 75 percent of the empty car weight, based on a brake cylinder pressure of 50 lbs. per square inch, except refrigerator cars equipped with cast iron wheels which shall have a nominal braking ratio of not less than 50 nor more than 60 percent of the empty car weight based on 50 lbs. per square inch brake cylinder pressure. In interchange.

All freight cars built new or rebuilt on and after Jan. 1, 1965, offered in interchange, having metal brakeshoes, shall have a nominal braking force of 75 percent of the empty car weight or as close thereto as possible, but in no event to exceed 80 percent of the empty car weight, and not less than 18 percent nor more than 35 percent of the gross rail load, based on a brake cylinder pressure of 50 lbs. per square inch. In interchange."

Accordingly, it is essential that all new or rebuilt freight car braking systems comply with this requirement. In order to comply, some prior art braking systems employed one cylinder-piston assembly of one size and a second cylinder-piston assembly of a different size. That is, on cylinder-piston assembly was employed for a loaded car condition and the other cylinder-piston assembly was used when the car was empty. Under certain conditions both cylinders were used and two reservoirs of air had to be used which was costly in fabrication as well as consuming more air than was required with conventional equipment. This dual system was complicated and expensive to fabricate. Another prior art system employed a single piston and cylinder assembly wherein air pressure was exerted against the front of the piston only when the car was loaded and air pressure was exerted against the front and a portion of a back of the piston when the car was empty. This system worked to some extent, but it required a complicated and expensive piston and cylinder piping arrangement. It will be appreciated that air piping on a railroad car has certain disadvantages not only because of the expense and difficulty of installation thereof but also care must be exercised to eliminate any low spots in the piping where water can accumulate and, in winter, freeze, thereby plugging the air line. Also, large volumes of additional air were required for prior art mechanisms.

In the system described in U.S. Pat. No. 3,335,825, of which we were coinventors, a compound fluid piston was used which had a first stroke length with one piston diameter and a second stroke length with the second piston diameter. This system is very effective for many installations. The present invention concerns improvements thereover.

In the usual brake systems employed in railway cars, the brake fluid, e.g. air, is supplied from a fluid reservoir mounted on the car. It will be appreciated that as the volume of the fluid system increases because of the application of the brakes, and the movement of the brake piston which increases the volume of the fluid cylinder in front of the piston, the fluid pressure will decrease as the piston increases. This means that with a variable piston stroke the volume of fluid drawn from the reservoir varies as well as the braking force. It is desirable to avoid variations in the volume of fluid drawn from the reservoir with different car loads and to avoid different piston stroke lengths. In the braking apparatus of the invention, the volume of fluid in the fluid cylinder and the piston stroke length may be maintained substantially constant even though the braking force is varied with car loads.

The present invention involves a novel combination of features combined in such a way as to afford a very efficient solution to the difficulties encountered with the prior art braking system, as well become apparent as the description proceeds.

Railway cars have a stationary truck side frame and a truck bolster mounted for vertical movement, the vertical position being determined by the load carried by the railway car. The braking apparatus of the invention comprises a fluid cylinder having an outer piston sleeve mounted therein. An inner piston is mounted within the outer piston sleeve and a sleeve and push rod are carried by the inner piston. A return spring serves to return the outer piston sleeve and the inner piston to their original positions. Means controlled by the relative positions of the truck side frame and truck bolster with different loads are employed for limiting the outer piston sleeve's operative travel with respect to the inner piston's operative travel when the brake mechanism is applied and only when the railway car is in its empty condition, whereby the push rod transmits a first force when the railway car is empty and a second force when the railway car is loaded. Conventional lever means interconnect the push rod and the brakeshoes.

According to a further aspect of our invention, at least one additional intermediate piston sleeve is mounted between the outer piston sleeve and the inner piston and means are provided for also limiting the intermediate piston sleeve's operative travel with respect to the inner piston's operative travel when the brake mechanism is applied and the railway car is in a partially loaded condition. That is, the push rod transmits a first force when the railway car is empty, a second force when the railway car is partially loaded, and a third force when the railway car is in a loaded condition.

According to another aspect of our invention, the means for limiting the outer piston sleeve's operative travel with respect to the inner piston's operative travel includes a stop pin mounted for projection through the fluid cylinder to engage the end of the outer piston sleeve. Means are provided for retracting the stop pin when the railway car is in a loaded condition which comprise a cable having one end attached to the pin, and means attached to the other end thereof which are operatively responsive to the relative vertical positions of the truck bolster and the truck side frame.

Several preferred embodiments of the invention have been chosen for purposes of illustration and description, and are shown in the accompanying drawings, forming a part of the specification wherein:

FIG. 1 is a schematic perspective view of the braking apparatus constructed in accordance with the invention;

FIG. 2 is a fragmentary, schematic, plan view of a railway car having a braking apparatus according to the invention mounted thereon;

FIG. 3 is an enlarged, vertical, sectional view of the fluid piston and cylinder assembly when the railway car is loaded and the brakes are applied;

FIG. 4 is an enlarged, vertical, sectional view similar to FIG. 3, but showing the assembly when the railway car is empty and the brakes are applied;

FIG. 5 is an enlarged, vertical, sectional view similar to FIGS. 3 and 4, but showing the assembly when the brakes are released;

FIG. 6 is an enlarged, vertical, sectional view of another embodiment of the fluid piston and cylinder assembly when the brakes are released;

FIG. 7 is an enlarged, vertical, sectional view similar to FIG. 6, but showing the assembly when the railway car is empty and the brakes are applied;

FIG. 8 is an enlarged, vertical, sectional view similar to FIGS. 6 and 7, but showing the assembly when the railway car is partially loaded and the brakes are applied;

FIG. 9 is an enlarged, vertical, sectional view similar to FIGS. 6-8, but showing the assembly when the railway car is fully loaded and the brakes are applied;

FIG. 10 is an enlarged, fragmentary view, partly in section, of the apparatus in FIG. 2 and is taken along the line indicated at 10—10 in FIG. 2, and shows the attachment of the actuating cable to the stationary truck side frame and truck bolster;

FIG. 12 is an enlarged, fragmentary, sectional view of the apparatus in FIG. 10 and is taken along the line indicated at 12—12 in FIG. 10;

FIG. 13 is an enlarged, exploded view showing details of the attachment of the actuating cable to the stationary truck side frame and truck bolster;

FIG. 17 is a diagrammatic view showing the braking apparatus as applied to a typical hopper car;

FIG. 18 is a diagrammatic view showing the braking apparatus as applied to a typical boxcar; and FIG. 19 is a diagrammatic view showing the braking apparatus as applied to one struck of a railway car.

Figure 11:
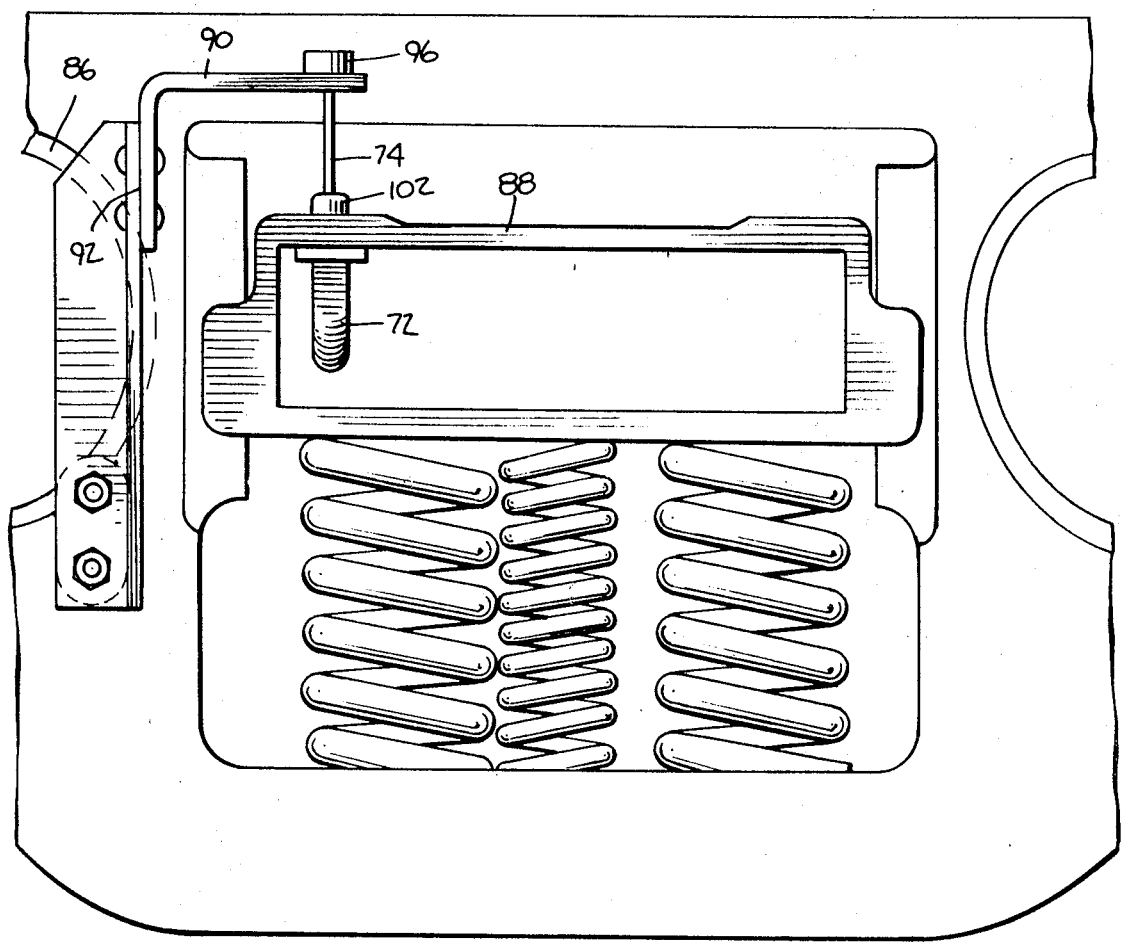
FIG. 11 is a fragmentary end view of the mechanism shown in FIG. 10 and is taken along the line indicated at 11—11 in FIG. 10.

In the embodiment of the invention illustrated in FIGS. 1 and 2, a standard conventional type railway car is shown having a body or frame 10, FIG. 2, and a truck indicated generally at 12. There is a compound air piston and cylinder assembly 14 which is fixedly attached to the frame 10 as at 16, FIG. 2. An actuating cable assembly 18 has one end attached to the compound air piston and cylinder assembly 14 as at 20, and the other end thereof is attached to the side frame of the truck as at 21, FIG. 2, for purposes of actuating said air piston and cylinder assembly responsive to the relative positions of the truck bolster and the truck side frame in a manner which will be discussed more fully hereinafter.

As best seen in FIGS. 3-5, the compound air piston and cylinder assembly 14 comprises a fluid cylinder 22 having a fluid chamber 22a and a cylinder wall 24 which is adapted to receive an outer piston sleeve 26 which, in turn, receives an inner piston 28 having a pressure head 28a and a no pressure head 28b. Attached to the piston is a sleeve 29. Mounted within the sleeve 29 is a push rod 30 which is free to float when the hand brake is applied. A coil spring 32 is mounted on the sleeve 29 for returning the piston and sleeve to its left hand position, as viewed in FIGS. 3-5. A suitable source of air, such as the car air reservoir, not shown, is connected to an air connection 34 of the cylinder 22. Means are provided for selectively limiting the operative travel of the outer piston sleeve 26 with respect to the operative travel of the inner piston when the brake mechanism is applied and only when the railway car is in a nonloaded condition which means comprise a stop pin 36 mounted for protrusion through the fluid cylinder wall 24 to engage an end of the outer piston sleeve 26. It will be appreciated that the pin is located in the nonpressure area of the cylinder. Means are provided for retracting the stop pin 36 when the railway car is in a loaded condition, as will be discussed more fully hereinafter.

Referring to FIG. 5, the assembly is shown in the brakes released position wherein the inner piston 28, the outer piston sleeve 26 and the piston rod 30 are in their far left positions, due to the action of the coil spring 32. As pointed out hereinbefore, one of the objects of this invention is to provide a variable braking force depending upon the condition of the car, i.e. loaded or empty. Accordingly, the force produced by the assembly 14, as transmitted by the piston rod 30, is considerably greater for a loaded car as compared to an empty car. This is accomplished by providing a substantially greater effective piston area when the car is loaded as compared to when the car is empty. Referring to FIG. 3, the assembly is shown when the railway car is loaded and the brakes are applied. In this position the stop pin 36 is in its retracted position. The air pressure bears against the outer piston sleeve 26 as well as the inner piston 28, thereby providing an effective piston area substantially equal to the entire area of the inside of the cylinder wall 24. It will be appreciated that the area of the opening 38 in the outer piston sleeve 26 is less than the effective area of the outer piston sleeve so that the outer piston sleeve 26 and the inner piston 28 will remain in engagement with each other when the railway car is loaded and the pin 36 is retracted.

Referring to FIG. 4, the assembly is shown when the railway car is empty and the brakes are in their applied position. In this position the stop pin 36 is in its extended position, and hence when air pressure is applied the outer piston sleeve 26 moves to the right, as viewed in FIG. 4, until it is stopped by the stop pin 36, thereby permitting the air pressure to operate against the smaller effective area corresponding to the inner piston 28 and resulting in a substantially lower braking force. It will be appreciated that the operative travel, or stroke length, of the push rod 30 and the volume of the fluid chamber 22a are substantially the same regardless of whether the railway car is loaded or empty, as seen by comparing FIGS. 3 and 4.

Referring now to FIGS. 6 to 9 inclusive, there is shown another form of compound air piston and cylinder assembly 40 comprising a fluid cylinder 42 having a cylinder wall 44 which is adapted to receive an outer piston sleeve 46 which, in turn, receives an intermediate piston sleeve 48. The intermediate piston sleeve 48 receives an inner piston 50 having a push rod sleeve 52, a coil spring 54 mounted on the push rod sleeve 52 for purposes of returning the piston 50 to the top of its stroke. A suitable source of air, not shown, is connected to the air connection 56. Means are provided for selectively limiting the operative travel of the outer piston sleeve 46 and the intermediate piston sleeve 48 with respect to the operative travel of the inner piston 50 when the brake mechanism is applied and the railway car is in a nonloaded or partially loaded condition, but not when the car is fully loaded. The last-named means comprises a stop pin 58 corresponding to the stop pin 36 and mounted for protrusion through the fluid cylinder wall 44 to engage both the end of the outer piston sleeve 46 and the end of the intermediate piston sleeve 48 or to engage only the end of outer piston sleeve 46. Means are provided for partially or fully retracting the stop pin 58 when the railway car is loaded or partially loaded, as will be discussed more fully hereinafter.

Referring to FIG. 6, the assembly is shown in the brakes released position wherein the inner piston 50, the inner piston sleeve 48 and the outer piston sleeve 46 are in their far left positions due to the action of the coil spring 54. Again, it will be appreciated that one of the objects of this invention is to provide a variable braking force depending upon the condition of the railway car, i.e. loaded, partially loaded, or empty. Accordingly, the force produced by the assembly 40, as transmitted by the piston rod 52, is large for a fully loaded car, intermediate for a partially loaded car and small for an empty car. This is accomplished by varying the effective piston area, but retaining the same length of piston stroke. Referring to FIG. 7, the assembly is shown when the railway car is empty and the brakes are applied. In this position the stop pin 58 is in its fully extended position, thereby blocking the outer piston sleeve 46 as well as the intermediate piston sleeve 48. Hence, when air pressure is applied and the sleeves 46 and 48 are against the pin 58, it is effective against the smaller area corresponding to face of the inner piston 50, only, thereby resulting in a low braking force.

Referring to FIG. 8, the assembly is shown when the railway car is partially loaded and the brakes are applied. In this position the stop pin 58 is in its partially extended position, thereby blocking only the outer piston sleeve 46. When air pressure is applied, it is effective against the area corresponding to the face of the inner piston 50 plus the face of the intermediate piston sleeve 46, thereby resulting in an intermediate braking force. In FIG. 9, the assembly is shown when the railway car is fully loaded and the brakes are applied. In this position the stop pin 58 is in its fully retracted position. The air pressure bears against the faces of the outer piston sleeve 46, the intermediate piston 48, as well as the inner piston 50, thereby providing the maximum piston area, which is substantially equal to the entire area of the inside of the cylinder wall 44. Again, it will be appreciated that the stroke of the push rod and the volume of the cylinder fluid chamber are substantially the same regardless of the force being transmitted, as seen in FIGS. 7, 8 and 9.

The stop pin 58, FIGS. 6–9, is constructed in the same manner and operates in the same manner as the stop pin 36, FIGS. 3–5, and hence only the stop pin 36 and its associated elements will be discussed in detail. The pin 36 extends through an opening 60 in the fluid cylinder wall 24. The means for mounting and operating the stop pin 36, FIGS. 3–5, comprises a base plate 62 mounted on the outside of the fluid cylinder wall 24 and a stop pin housing 64 mounted on the base plate 62. A stop pin spacer 66 is fixedly mounted on the stop pin, and a return spring 68 is interposed between the spacer 66 and an intermediate inwardly directed projection 70 on the housing 64 to urge the pin to project through the opening 60 and engage the end of the outer piston sleeve 26, as seen in FIG. 4.

As best seen in FIG. 1, the actuating cable assembly 18 includes an outer sheath 72 which encompasses cable 74. Reverting to FIGS. 3–5, the outer sheath 72 is mounted on the bottom of the stop pin housing 64 as at 76, and the cable 74 has a slot and pin connection with the stop pin 36, as at 78. Means are attached to the other end of the cable assembly which are operatively responsive to the vertical position of the truck bolster.

In some installations the railway car body may be subjected to sudden bumps or variations in movement. In order to prevent this sudden irregular movement from transmitting a "false" signal to the stop pin 36 various means are employed for dampening out such sudden irregular movements, but allowing the true signal indicating the vehicle loading to reach the stop pin 36. In one form of our invention, the stop pin housing 64 is filled with a fluid 80, such as oil, and holes 82 are provided in the stop pin spacer 66. The spacer 66 has a relatively snug fit with respect to the housing 64 so that the holes 82 become a retardent by allowing the fluid to slowly move from one side to the other, thereby retarding, but not eliminating, the movement of the stop pin 36. In addition to, or alternatively to, the retardent action of the stop pin spacer 66, a spring assembly unit, indicated generally at 83, FIG. 1, may interconnect lengths of the cable 74. The spring assembly unit 83 includes a spring 84 and a housing 85. The spring serves to take care of vibration of the railway car. The combination of the spring assembly unit 83 with the fluid 80 in the housing 64 is particularly desirable. That is, the spring serves to take care of the railway car vibration while the fluid serves to slow down the spring action. This damping apparatus is particularly desirable for certain installations, but on other installations the spring 84 and the fluid 80 would not be needed.

As best seen in FIGS. 10 and 11, the railway truck has a stationary truck side frame 86 and a truck bolster 88 mounted for vertical movement with the railway car body, the vertical position being responsive to the load carried by the railway car. A bracket 90 is mounted on the truck side frame 86 as at 92, FIG. 11, and may be secured thereto without welding. In another embodiment of the invention, the bracket may take the form as indicated at 90', FIGS. 15 and 16. As pointed out hereinbefore, one end of the cable 74 is connected to the pin 36, as at 78, FIG. 3. The other end of the cable 74 passes through an aperture 94, FIG. 12, in the bracket 90 and the end thereof is secured by means of a lock block 96, which includes a set screw 98 for clamping purposes. A cable guide 100 is mounted in an aperture in the truck bolster 88 in a position adjacent the bracket 90, and a locking cap 102, having a seal 104, is threadedly mounted thereon. The other end of the sheath 72 is mounted on the bottom of the cable guide 100, as at 106, so that vertical movement of the truck bolster 88 with respect to the bracket 90 on the truck side frame 86 causes corresponding movement of the cable 74 with respect to the sheath 72. This movement is transmitted along the cable assembly 18, FIG. 1, to the piston stop pin 36, FIGS. 3–5, or the piston stop pin 58, FIGS. 6–9. That is, when the car is lightly loaded, the bracket 90 and the cap 102 are relatively close together, the spring 68, FIGS. 3–5, causes the stop pin 58 to pass through the fluid cylinder to engage the end of the outer piston sleeve, but when the truck bolster 88 and hence, the sheath 72, FIG. 12, more downwardly due to the loading of the railway car, the cable 74 retracts the pin 36, FIG. 3, thereby allowing maximum piston force to be exerted by the push rod 30.

Figure 14:
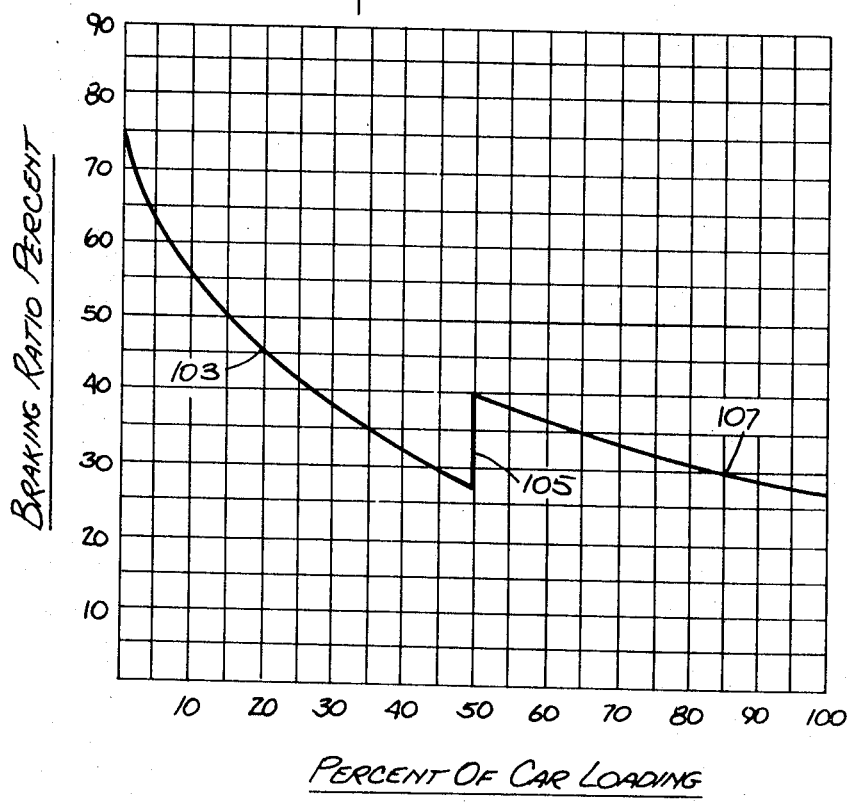
FIG. 14 is a graph showing the relationship between the braking ratio percent with respect to the percent of car loading.

Referring to FIG. 14, there is illustrated a typical braking ratio curve for the braking apparatus as described in the embodiment of FIGS. 3–5. It is noted that the portion of the curve designated at 103 shows the braking ratio when the railway car is partially loaded and the brakes are applied. In this position the stop pin is in its extended position, thereby limiting the travel of the outer piston sleeve, and hence permitting the air pressure to operate against the smaller effective area, and resulting in a lower braking force. A change over line, indicated at 105, is shown at 50 percent of car loading for illustrative purposes. Actually, this line could be moved to a slightly higher or lower rating, as desired. It is noted that a curve showing the braking apparatus of FIGS. 6–9 would have two spaced change over lines. The portion 107 of the curve above the change over line shows the ratio when the railway car is substantially loaded. In this position the stop pin is in its retracted position, thereby allowing the outer piston sleeve to move, and hence permitting the air pressure to operate against the larger effective area, and resulting in a larger braking force. It will be appreciated that such an operating curve can readily be designed to fall within the operating ranges set forth by the Association of American Railroads even for every large railway cars which have a very large range between empty and full loads.

Figure 15:
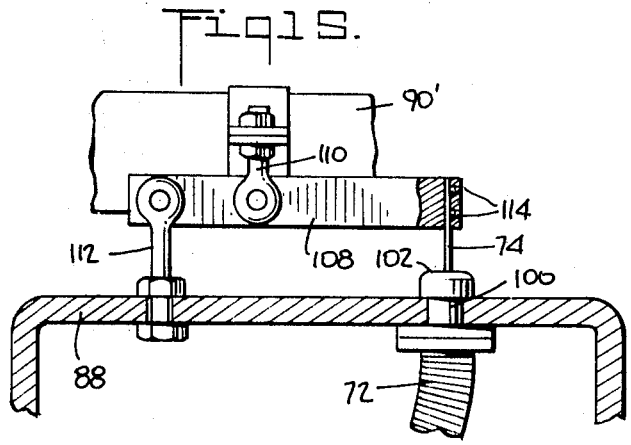
FIG. 15 is an enlarged side elevation showing another form of attachment of the actuating cable to the stationary truck side frame and truck bolster which provides a movement multiplying arrangement.
Figure 16:
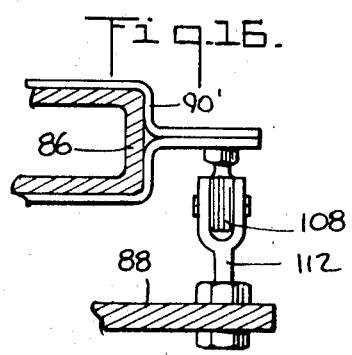
FIG. 16 is an end view of the attachment of FIG. 15 showing the attaching means for connecting the actuating cable to the stationary truck side frame.

Referring next to FIGS. 15 and 16, there is shown therein another form of arrangement for connecting the cable assembly to the stationary truck side frame and truck bolster. In this arrangement a lever arrangement is added to increase the movement of the cable 74 with respect to the sheath 72. A lever 108 is medially pivotally connected to the bracket 90' on the side frame 86 as by means of a yokelike bolt 110. One end of the lever 108 is pivotally connected to the bolster 88 as by means of a yokelike bolt 112. The cable 74 is fixedly connected to the other end of the lever 108 as by means of set screws 114. The sheath 72, of the cable assembly, is mounted on the bolster in the same manner as described hereinbefore in connection with the embodiment of FIG. 12. Accordingly, the ratio of movement of the cable 74 with respect to the sheath 72 as compared to the movement of the truck bolster 88 with respect to the stationary truck side frame 86, is increased by the ratio of the length of the lever arm between the bolt 110 and the connection of the cable 74 as compared to the length of the lever arm between the bolt 112 and the bolt 110.

It will be appreciated that in normal operation there will be relative movement, when the railway car is turning, between the car body 10 and the truck 12. Hence, slack 116, FIG. 2, is provided in the cable assembly 18, to accommodate this movement.

FIGS. 17-19 illustrate diagrammatically conventional lever systems for interconnecting the push rod 30 with the brake shoes of the railway car. In FIG. 17, a fulcrum lever 118 has one end pivotally attached to the car body as at 120, and the air piston and cylinder assembly 14 carrying the push rod 30 is pivotally connected to a medial portion thereof, as at 124. A first pull rod 126 has one end pivotally connected at 128 to the other end of the fulcrum lever 118, and the other end of the first pull rod 126 is connected to one end of a first live lever 130, as at 132. One end of a second pull rod 134 is pivotally connected to the other end of the first live lever 130, as at 136. A first brakeshoe mechanism, indicated generally at 138, is pivotally connected at 140 to the other end of the second pull rod. A conventional slack adjuster 142 has one end connected to a medial portion of the first live lever 130, as at 144, and the other end thereof is connected at 148 to one end of a center rod 146. A dead fulcrum lever 150 has one end pivotally anchored at 152 to the car body, and the other end of the center rod 146 is connected to a medial portion of the dead fulcrum lever, as at 154. A third pull rod 156 has one end pivotally connected at 158 to the other end of said dead fulcrum lever, and the other end thereof is pivotally connected to a second brakeshoe mechanism, indicated generally at 159, as at 160. The first brakeshoe mechanism 138 includes brakeshoes 162 which are mounted in operative relationship to the periphery of the wheels (not shown) on one truck of a railway car, and the second brakeshoe mechanism 158 includes brake shoes 164 which are mounted in operative relationship to the periphery of the wheels (not shown) on the other truck of the railway car. The slack adjuster 142 is extensible and retractable for eliminating the slack and controlling the travel of the brakeshoe mechanisms, and it is lockable in a rigid condition when transmitting the braking force to the brakeshoe mechanisms.

Referring to FIG. 18, a first live lever 166 is pivotally attached to the end of the push rod 30 extending from the air piston and cylinder assembly 14, as at 168. A first pull rod 170 is connected at 172 to the other end of the first live lever 166, and a first brakeshoe mechanism, indicated generally at 174, is connected to the other end of the pull rod 170, as at 176. The brakeshoe mechanism includes brakeshoes 178 which are mounted in operative relation to the periphery of the wheels (not shown) on one truck of the railway car. A conventional slack adjuster 180 has one end connected at 182 to a medial portion of the first live lever 166, and one end of a center rod 184 is connected to the other end of the slack adjuster 180, as at 186. A dead fulcrum lever 188 has one end pivotally attached at 190 to the car body, and the other end of the center rod 184 is connected to a medial portion thereof, as at 192. A second pull rod 194 has one end connected to the other end of the dead fulcrum lever 188, as at 196. A second brakeshoe mechanism, indicated generally at 198, is connected to the other end of the second pull rod 194, as at 200. The second brakeshoe mechanism includes brakeshoes 202 which are mounted in operative relationship to the periphery of the wheels (not shown) on the other truck of the railway car. The slack adjuster 180 is extensible and retractable for eliminating the slack and controlling the travel of the brake mechanisms, and it is lockable in a rigid condition when transmitting the brake force to the brakeshoe mechanisms.

Next, referring to FIG. 19, a first lever 204 has one end pivotally connected to the end of the push rod 30 of the air piston and cylinder assembly 14, as at 206. The other end of the first live lever is pivotally attached to the truck bolster, as at 205. A first truck live lever 208 has one end which slidably engages the other end of the first lever 204, as at 210. A second brakeshoe mechanism, indicated generally at 212, is attached at 214 to a medial portion of the first truck live lever 208. One end of a conventional slack adjuster 216 is connected at 218 to the other end of the truck liver lever 208, and the other end thereof is connected to one end of a truck dead lever 220, as at 222. A dead lever 224 has both ends attached to the truck bolster, as at 226 and 228. The other end of the truck dead lever 220 slidably engages at 230 a medial portion of the dead lever 224. A second brakeshoe mechanism, indicated generally at 232, is connected at 234 to a medial portion of the truck dead lever 220. The first brakeshoe mechanism 212 includes brakeshoes 236 and the second brakeshoe mechanism 232 includes brakeshoes 238 which are mounted in operative relationship to the periphery of the wheels (not shown) on one truck of a railway car. The slack adjuster 216 is extensible and retractable for eliminating the slack and controlling the travel of the brake mechanisms, and it is lockable in a rigid condition when transmitting the braking force to the braking mechanisms.

Although certain particular embodiments of the invention are herein disclosed for purposes of explanation, various modifications thereof, after study of this specification, will be apparent to those skilled in the art to which the invention pertains.

What is claimed and desired to be secured by Letters Patent is:

1. Braking apparatus for a railway car having a stationary truck side frame, a truck bolster mounted for vertical movement, the vertical position being responsive to the load carried by said railway car, said apparatus comprising control means actuatably responsive to the relative positions of said truck side frame and said truck bolster, a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake mechanism is applied and said railway car is in a nonloaded condition, said means for limiting the outer piston sleeve's operative travel being movable by said control means, whereby said push rod transmits a first force when said railway car is empty and a second force when said railway car is loaded, lever means, said lever means being actuated by said push rod and a brakeshoe mechanism, said lever means being connected to said brakeshoe mechanism.

2. Braking apparatus for a railway car having a stationary truck side frame, a truck bolster mounted for vertical movement, the vertical position being responsive to the load carried by said railway car, said apparatus comprising a fluid cylinder, an outer piston sleeve mounted in said fluid cylinder, an inner piston mounted in said outer piston sleeve, a push rod carried by said inner piston, a sleeve carried by said inner piston and said push rod being mounted in said sleeve and being free to float when a handbrake is applied, a return spring for said outer piston sleeve and said inner piston, means for limiting the outer piston sleeve's operative travel with respect to the inner piston's operative travel only when said brake mechanism is applied and said railway car is in a nonloaded condition, whereby said push rod transmits a first force when said railway car is empty and a second force when said railway car is loaded, lever means, said lever means being actuated by said push rod and a brakeshoe mechanism, said lever means being connected to said brakeshoe mechanism.

3. Braking apparatus for a railway car having a stationary truck side frame, a truck bolster mounted for vertical movement, the vertical position being responsive to the load carried by said railway car, said apparatus comprising a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake mechanism is applied and said railway car is in a nonloaded condition, whereby said push rod transmits a first force when said railway car is empty and a second force when said railway car is loaded, lever means, said lever means being actuated by said push rod and a brakeshoe mechanism, said lever means being connected to said brakeshoe mechanism, and at least one additional intermediate piston sleeve mounted between said outer piston sleeve and said inner piston, and means for limiting the intermediate piston sleeve's operative travel with respect to the inner piston's operative travel when said brake apparatus is applied and said railway car is in a partially loaded condition whereby said push rod transmits a first force when said railway car is empty, a second force when said railway car is partially loaded and a third force when said railway car is in a loaded condition.

4. Braking apparatus for a railway car having a stationary truck side frame, a truck bolster mounted for vertical movement, the vertical position being responsive to the load carried by said railway car, said apparatus comprising a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake mechanism is applied and said railway car is in a nonloaded condition, said means for limiting the outer piston sleeve's operative travel with respect to the inner piston's operative travel only when said brake apparatus is applied and said railway car is in an empty condition comprising a stop pin mounted for projection through said fluid cylinder to engage the end of said outer piston sleeve, means for retracting said stop pin when said railway car is in a loaded condition, whereby said push rod transmits a first force when said railway car is empty and a second force when said railway car is loaded, lever means, said lever means being actuated by said push rod and a brakeshoe mechanism, said lever means being connected to said brakeshoe mechanism.

5. Apparatus according to claim 3, wherein said means for limiting the outer piston sleeve's operative travel and the means for limiting the intermediate piston sleeve's travel comprises a stop pin mounted for protrusion through said fluid cylinder to engage the end of said outer piston sleeve and the end of said intermediate piston sleeve, means for retracting said pin a first distance to allow movement of said intermediate piston's sleeve but preventing movement of said outer piston sleeve when said railway car is in a partially loaded condition, and for retracting said pin a second distance to allow movement of said intermediate piston sleeve and said outer piston sleeve when said railway car is in a loaded condition.

6. Apparatus according to claim 5 wherein said stop pin protrudes through said fluid cylinder in a nonpressure area of the cylinder.

7. Apparatus according to claim 4 wherein said means for retracting said stop pin comprises a cable having one end attached to said pin, means attached to the other end of said cable operatively responsive to the vertical position of said bolster.

8. Braking apparatus for a railway car having a stationary truck side frame, a truck bolster mounted for vertical movement, the vertical position being responsive to the load carried by said railway car, said apparatus comprising a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake mechanism is applied and said railway car is in a nonloaded condition, said means for limiting the outer piston sleeve's operative travel with respect to the inner piston's operative travel only when said brake apparatus is applied and said railway car is in an empty condition comprising a stop pin, an opening in said fluid cylinder through which said pin is projectable, a stop pin housing mounted on the outside of said fluid cylinder in which said stop pin is mounted, a stop pin spacer fixedly mounted on said pin, a stop pin return spring interposed between said housing and said spacer to urge said pin to project through said opening and engage the end of said outer piston sleeve, cable means having one end attached to said pin for retracting said pin, said cable means passing through said housing, and means attached to the other end of said cable means operatively responsive to the vertical position of said truck bolster, whereby said push rod transmits a first force when said railway car is empty and a second force when said railway car is loaded, lever means, said lever means being actuated by said push rod and a brakeshoe mechanism, said lever means being connected to said brakeshoe mechanism.

9. Apparatus according to claim 8 further comprising a fluid in said housing, and wherein said stop pin spacer has a substantially close sliding fit within said stop pin housing and wherein said stop pin spacer has holes therethrough for the passage of said fluid.

10. Apparatus according to claim 8 further comprising spring means interposed in said cable means.

11. Apparatus according to claim 8 further comprising a fluid in said housing, and wherein said stop pin spacer has holes for the passage of said fluid therethrough, a spring mounted in said cable means.

12. Apparatus according to claim 8 wherein said cable means comprises a cable mounted in a sheath, one end of said cable being attached to the stop pin and the adjacent end of said sheath being attached to the stop pin housing, a bracket mounting on said truck side frame, the other end of said cable being attached to said bracket, the other end of said cable sheath being attached to said truck bolster in a position adjacent said bracket whereby vertical movement of said truck bolster with respect to said truck side frame causes responsive movement of said stop pin.

13. Apparatus according to claim 12 further comprising a lock block for attaching the other end of said cable to the bracket, and further comprising a cable guide mounted on said truck bolster, a locking cap mounted on said cable guide and a seal mounted on said locking cap, said cable sheath being attached to said cable guide and said cable extending upwardly through said cable guide and said locking cap and said seal.

14. Apparatus according to claim 7 wherein said means attached to the other end of said cable operatively responsive to the vertical position of said truck bolster, comprises a lever having one end pivotally connected to said truck bolster, a medial portion of said lever being connected to said truck side frame, said cable having one end connected to the other end of said lever, the distance between the truck bolster connection and the truck side frame connection being less than the distance between the truck side frame connection and the cable connection on said lever arm, whereby movement of said cable with respect to said sheath is greater than the movement of said truck bolster with respect to the truck side frame.

15. Braking apparatus for a railroad car having a stationary truck side frame, a truck bolster mounted for vertical movement, the vertical position being responsive to the load carried by said railway car, said apparatus comprising a fluid cylinder, an outer piston sleeve mounted in said fluid cylinder, an inner piston mounted in said outer piston sleeve, a push rod carried by said inner piston, a return spring for said outer piston sleeve and said inner piston, a stop pin, an opening in said fluid cylinder through which said pin is projectable, a stop pin housing mounted on the outside of said cylinder in which said stop pin is mounted, a stop pin spacer fixedly mounted on said stop pin, a stop pin return spring interposed between said housing and said spacer to urge said pin to project through said opening and engage the end of said outer piston sleeve, a cable mounted in a sheath, one end of said cable being attached to said stop pin and the adjacent end of said sheath being attached to the stop pin housing, a bracket mounted on said truck side frame, the other end of said cable being attached to said bracket, the other end of said cable sheath being attached to said truck bolster in a position adjacent said bracket, whereby vertical movement of said truck bolster with respect to said truck side frame causes responsive movement of said stop pin.

16. Braking apparatus for a vehicle having load responsive means and brake means for retarding movement of said vehicle, said apparatus comprising control means actuatably responsive to said load responsive means, a fluid cylinder, a piston sleeve mounted for movement in said cylinder, a piston mounted in said cylinder for movement with and for movement separately from said sleeve, means for urging said piston and said sleeve into a predetermined brake release position in said cylinder, means for supplying fluid under pressure to said cylinder to move said sleeve and said piston from said release position to second positions, means for interconnecting said piston and said brake means, and means for limiting the movement of said sleeve away from said release position under control of said load responsive means, said means for limiting the movement of said sleeve being movable by said control means.

17. Braking apparatus for a vehicle having load responsive means and brake means for retarding movement of said vehicle, said apparatus comprising a fluid cylinder, a piston sleeve mounted for movement in said cylinder, a piston mounted in said cylinder for movement with and for movement separately from said sleeve, means for urging said piston and said sleeve into a predetermined brake release position in said cylinder, means for supplying fluid under pressure to said cylinder to move said sleeve and said piston from said release position to second positions, means for interconnecting said piston and said brake means, and means for limiting the movement of said sleeve away from said release position under control of said load responsive means, said load responsive means comprising a pair of spaced members, the spacing of which being determined by the load on said vehicle and said means controlled by said load responsive means comprising means insertable into and out of the path of movement of said sleeve.

18. Apparatus as set forth in claim 16 wherein said sleeve extends around said piston and has a substantially fluidtight but separable connection therewith in said release position.

19. Braking apparatus comprising a fluid cylinder, an outer piston sleeve mounted in said fluid cylinder, an inner piston mounted in said outer piston sleeve, a push rod carried by said inner piston, a stop pin mounted for projection through said fluid cylinder to engage the end of said outer piston sleeve to transmit a first braking force, means for retracting said stop pin to transmit a second braking force.

20. Braking apparatus comprising a fluid cylinder, an outer piston sleeve mounted in said fluid cylinder, an intermediate piston sleeve mounted in said outer piston sleeve, an inner piston mounted in said intermediate piston sleeve, a push rod carried by said inner piston, a stop pin mounted for projection through said fluid cylinder to engage the end of said outer piston sleeve and the end of said intermediate piston sleeve, means for retracting said pin a first distance to allow movement of said intermediate piston sleeve but preventing movement of said outer piston sleeve, and for retracting said pin a second distance to allow movement of said intermediate piston sleeve and said outer piston sleeve.

21. Apparatus according to claim 19 further comprising a stop pin housing mounted on the outside of said fluid cylinder in which said stop pin is mounted, a stop pin spacer fixedly mounted on said pin, a stop pin return spring interposed between said housing and said spacer to urge said pin to project through said opening and engage the end of said outer piston sleeve, a cable having one end attached to said pin for retracting said pin, said cable passing through said housing.

22. Braking apparatus for a railway car having a stationary truck side frame, a truck bolster mounted for vertical movement, the vertical position being responsive to the load carried by said railway car, said apparatus comprising a fulcrum lever having one end pivotally anchored to said car body, motive means connected to an intermediate portion of said fulcrum lever, said motive means comprising a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake apparatus is applied and said railway car is in an empty condition, whereby said push rod transmits a first force when said railway car is empty and a second greater force when said railway car is loaded, a first pull rod having one end connected to the other end of said fulcrum lever, a live lever, the other end of said first pull rod connected to one end of said live lever, a second pull rod, the other end of said live lever being connected to one end of said second pull rod, a first brakeshoe mechanism, the other end of said second pull rod being connected to said first brakeshoe mechanism, slack adjusting means having one end connected to an intermediate portion of said live lever, a center rod having one end connected to the other end of said slack adjusting means, a dead fulcrum lever having one end pivotally anchored to said car body, the other end of said center rod being connected to a medial portion of said dead fulcrum lever, a third pull rod having one end connected to the other end of said dead fulcrum lever, a second brakeshoe mechanism, the other end of said third pull rod being connected to said second brakeshoe mechanism, said slack adjusting means being extensible and retractable for eliminating the slack and controlling the travel of said brakeshoe mechanisms, said slack adjusting means being lockable in a rigid condition when transmitting the braking force to said brakeshoe mechanisms.

23. Braking apparatus for a railway car having a stationary truck side frame, a truck bolster mounted for vertical movement, the vertical position being responsive to the load carried by said railway car, said apparatus comprising a live lever, motive means connected to one end of said live lever, said motive means comprising a fluid cylinder, an outer piston sleeve mounted in said fluid cylinder, an inner piston mounted in said outer piston sleeve, a push rod carried by said inner piston, a return spring for said outer piston sleeve and said inner piston, means for limiting the outer piston sleeve's operative travel with respect to the inner piston's operative travel only when said brake apparatus is applied and said railway car is in an empty condition, whereby said push rod transmits a first force when said rail car is empty and a second force when said rail car is loaded, a first pull rod having one end connected to the other end of said live lever, a first brakeshoe mechanism, the other end of said first pull rod being connected to said first brakeshoe mechanism, slack adjusting means having one end connected to an intermediate portion of said live lever, a center rod having one end connected to the other end of said slack adjusting means, a dead fulcrum lever having one end pivotally anchored to the car body, the other end of said center rod being connected to a medial portion of said dead fulcrum lever, a second pull rod having one end connected to the other end of said dead fulcrum lever, a second brakeshoe mechanism, the other end of said second pull rod being connected to said second brakeshoe mechanism, said slack adjusting means being extensible and retractable for eliminating the slack and controlling the travel of said brakeshoe mechanisms, said slack adjusting means being lockable in a rigid condition when transmitting the braking force to said brakeshoe mechanisms.

24. Braking apparatus for a railway car having a stationary truck side frame, a truck bolster mounted for vertical movement, the vertical position being responsive to the load carried by said railway car, said apparatus comprising a first lever having one end pivotally mounted on said bolster, a fluid piston and cylinder assembly including a fluid cylinder, an outer piston sleeve mounted in said fluid cylinder, an inner piston mounted in said outer position sleeve, a push rod carried by said inner piston, said push rod being connected to the other end of said first lever, a return spring for said outer piston sleeve and said inner piston, means for limiting the outer sleeve and said inner piston, means for limiting the outer piston sleeve's operative travel with respect to the inner piston's operative travel only when said brake apparatus is applied and said railway car is in an empty condition, whereby said push rod transmits a second greater force when said railway car is loaded, a truck live lever slidably engageable with a medial portion of said first lever, a first brakeshoe mechanism connected to a medial portion of said truck live lever, a slack adjuster having one end thereof connected to the other end of said truck live lever, a truck dead lever having one end thereof connected to the other end of said slack adjuster, a dead lever having both ends attached to said bolster, the other end of said truck dead lever being slidably engageable with a medial portion of said dead lever, a second brakeshoe mechanism connected to a medial portion of said truck dead lever, said slack adjusting means being extensible and retractable for eliminating the slack and controlling the travel of the brakeshoe mechanisms, said slack adjusting means being lockable in a rigid condition when transmitting the braking force to the brakeshoe mechanisms.